(12) United States Patent
Galpin et al.

(10) Patent No.: US 11,750,836 B2
(45) Date of Patent: Sep. 5, 2023

(54) VIRTUAL TEMPORAL AFFINE CANDIDATES

(71) Applicant: INTERDIGITAL VC HOLDINGS, INC., Wilmington, DE (US)

(72) Inventors: Franck Galpin, Thorigne-Fouillard (FR); Antoine Robert, Mezieres sur Couesnon (FR); Fabrice Leleannec, Mouaze (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/275,351

(22) PCT Filed: Sep. 12, 2019

(86) PCT No.: PCT/US2019/050755
§ 371 (c)(1),
(2) Date: Mar. 11, 2021

(87) PCT Pub. No.: WO2020/056095
PCT Pub. Date: Mar. 19, 2020

(65) Prior Publication Data
US 2022/0053209 A1   Feb. 17, 2022

(30) Foreign Application Priority Data

Sep. 13, 2018  (EP) ..................... 18290100

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/139* (2014.11); *H04N 19/176* (2014.11); *H04N 19/46* (2014.11)

(58) Field of Classification Search
CPC .... H04N 19/52; H04N 19/105; H04N 19/139; H04N 19/176; H04N 19/46
See application file for complete search history.

(56) References Cited

U.S. PATENT DOCUMENTS

2018/0098063 A1   4/2018  Chen et al.
2018/0359483 A1*  12/2018  Chen .................. H04N 19/44
(Continued)

FOREIGN PATENT DOCUMENTS

WO   WO2017118409   7/2017
WO   WO2017118411   7/2017
(Continued)

OTHER PUBLICATIONS

Hsu et al., Description of SDR Video Coding Technology Proposal by MediaTek 1,10. JVET Meeting; Oct. 4, 2018-Apr. 20, 2018, San Diego, (The Joint Video Exploration Team of ISO/IEC JTC1/SC29/WG11 and ITU-T SG.16), No. JVET-J0018.

*Primary Examiner* — Francis Geroleo
(74) *Attorney, Agent, or Firm* — Ronald Kolczynski

(57) ABSTRACT

Methods and apparatus for creating additional affine candidates. Virtual and temporal candidates are determined using neighboring spatial and temporal sub-blocks. The sub-blocks are examined in an order known to both an encoder and a decoder. Valid sub-blocks are used to compute an affine model. The candidates can be filtered and added to a candidate list conditionally based on various criteria. The candidates can be used to determine control point motion vectors and a motion flow field can be determined. Motion vectors for sub-blocks within a video coding block can be determined. Motion compensation can be performed using the improved affine candidates and encoding/decoding based on the improved affine motion compensation.

24 Claims, 25 Drawing Sheets

(51) Int. Cl.
*H04N 19/139* (2014.01)
*H04N 19/176* (2014.01)
*H04N 19/46* (2014.01)

(56) References Cited

U.S. PATENT DOCUMENTS

2019/0222834 A1* 7/2019 Chen .................. H04N 19/105
2021/0105481 A1* 4/2021 Kim .................... H04N 19/176

FOREIGN PATENT DOCUMENTS

| WO | WO2017147765 | 9/2017 |
| WO | WO2017157259 | 9/2017 |
| WO | WO2018128379 | 7/2018 |

* cited by examiner

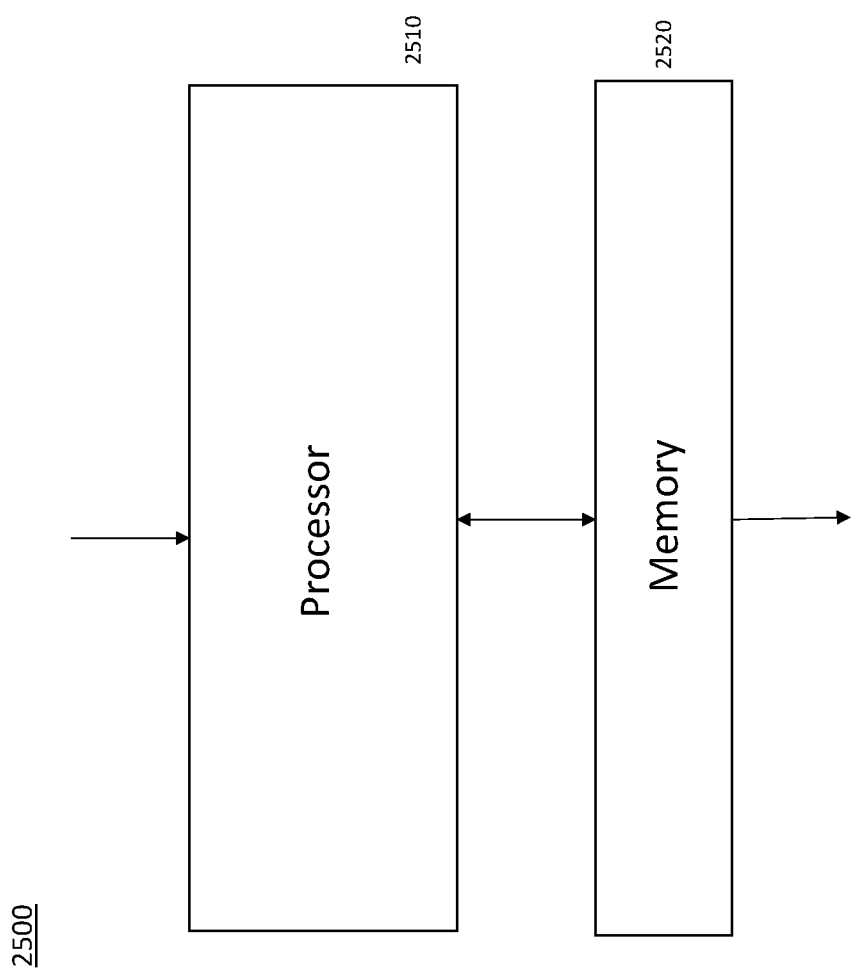

VIRTUAL TEMPORAL AFFINE CANDIDATES

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. Affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

SUMMARY

At least one of the present embodiments generally relates to a method or an apparatus for video encoding or decoding, and more particularly, to a method or an apparatus for selecting a predictor candidate from a set of predictor candidates for motion compensation based on a motion model such as, e.g., an affine model, for a video encoder or a video decoder.

According to a first aspect, there is provided a method. The method comprises steps for determining, for a sub-block of a video block being encoded in a picture, a plurality of predictor candidates from among neighboring sub-blocks and at least one reference picture; selecting a subset of the plurality of predictor candidates; determining from the subset of predictor candidates, one or more control point motion vectors for the video block; performing affine motion compensation for the sub-block of the video block being encoded using the one or more control point motion vectors; and, encoding the sub-block of the video block.

According to a second aspect, there is provided a method. The method comprises steps for determining, for a sub-block of a video block being decoded in a picture, a plurality of predictor candidates from among neighboring sub-blocks and at least one reference picture; selecting a subset of the plurality of predictor candidates; determining from the subset of predictor candidates, one or more control point motion vectors for the video block; performing affine motion compensation for the sub-block of the video block being decoded using the one or more control point motion vectors; and, decoding the sub-block of the video block.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 25 shows one embodiment of an apparatus for encoding or decoding using the general aspects described herein.

DETAILED DESCRIPTION

The general aspects described here are in the field of video compression. These aspects aim at improving compression efficiency compared to existing video compression systems.

In the HEVC video compression standard (H.265/HEVC High Efficiency Video Coding, ITU-T H.265 Telecommunication Standardization Sector of ITU, "Series H: Audiovisual and Multimedia Systems, Infrastructure of audiovisual services—Coding of moving video, High efficiency video coding."), motion compensated temporal prediction is employed to exploit the redundancy that exists between successive pictures of a video.

Figure 1:
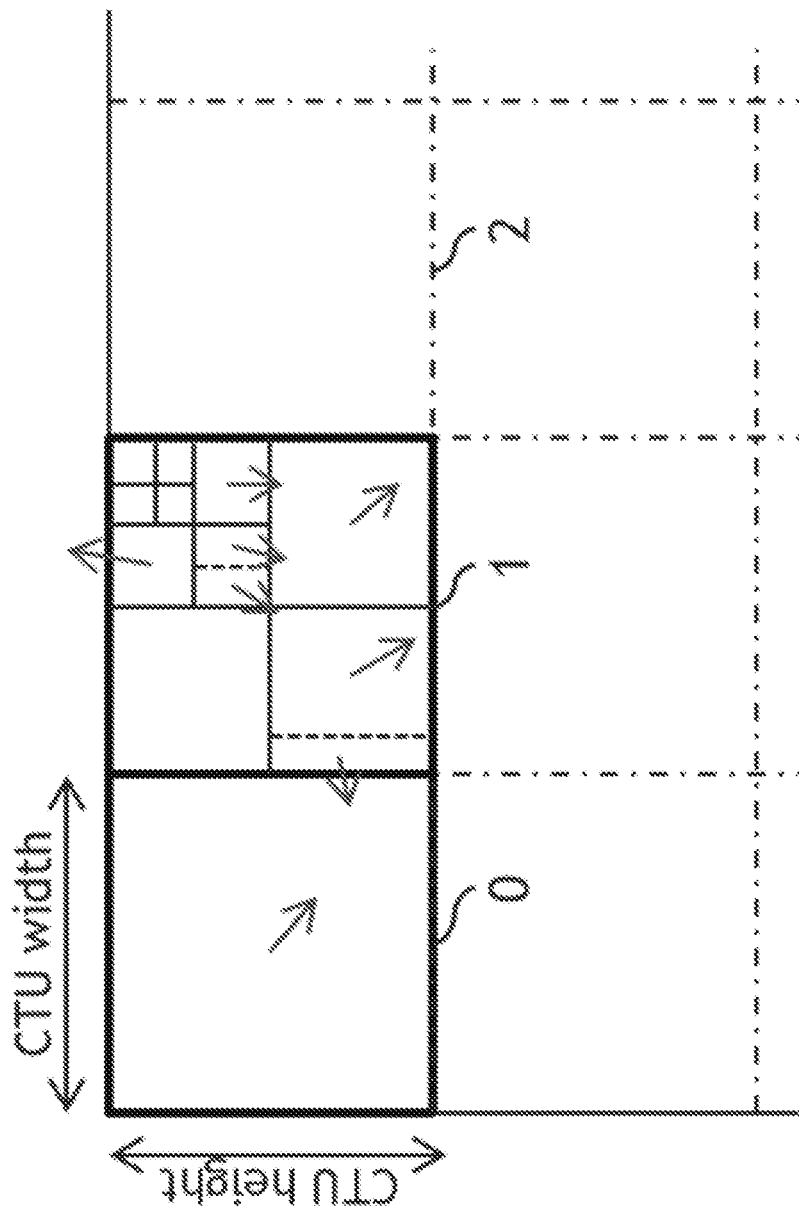
FIG. 1 shows an example of coding tree unit and coding tree concepts to represent a compressed HEVC picture.

To do so, a motion vector is associated to each prediction unit (PU), which is introduced now. Each CTU (Coding Tree Unit) is represented by a Coding Tree in the compressed domain. This is a quad-tree division of the CTU, where each leaf is called a Coding Unit (CU), see FIG. 1.

Figure 2:
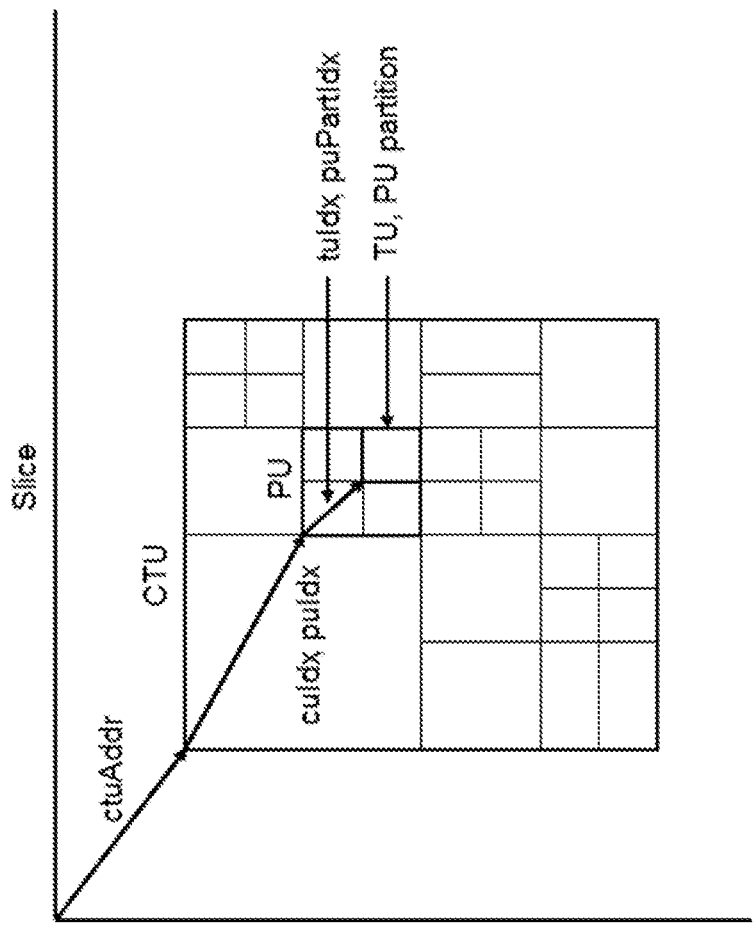
FIG. 2 shows an example of a division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Exactly one Motion Vector is assigned to each PU in HEVC. This motion vector is used for motion compensated temporal prediction of the considered PU. Therefore, in HEVC, the motion model that links a predicted block and its reference block simply consists in a translation.

In the Joint Exploration Model (JEM) and later VTM (Versatile Video Coding (VVC) Test Model) developed by the JVET (Joint Video Exploration Team) group, some richer motion models are supported to improve temporal prediction. To do so, a PU can be spatially divided into sub-PU and a richer model can be used to assign each sub-PU a dedicated motion vector.

A CU is no longer divided into PU or TU, and some motion data is directly assigned to each CU. In this new codec design, a CU can be divided into sub-CU and a motion vector can be computed for each sub-CU.

One of the new motion models introduced in the JEM is the affine model, which basically consists in using an affine model to represent the motion vectors in a CU.

Figure 3:
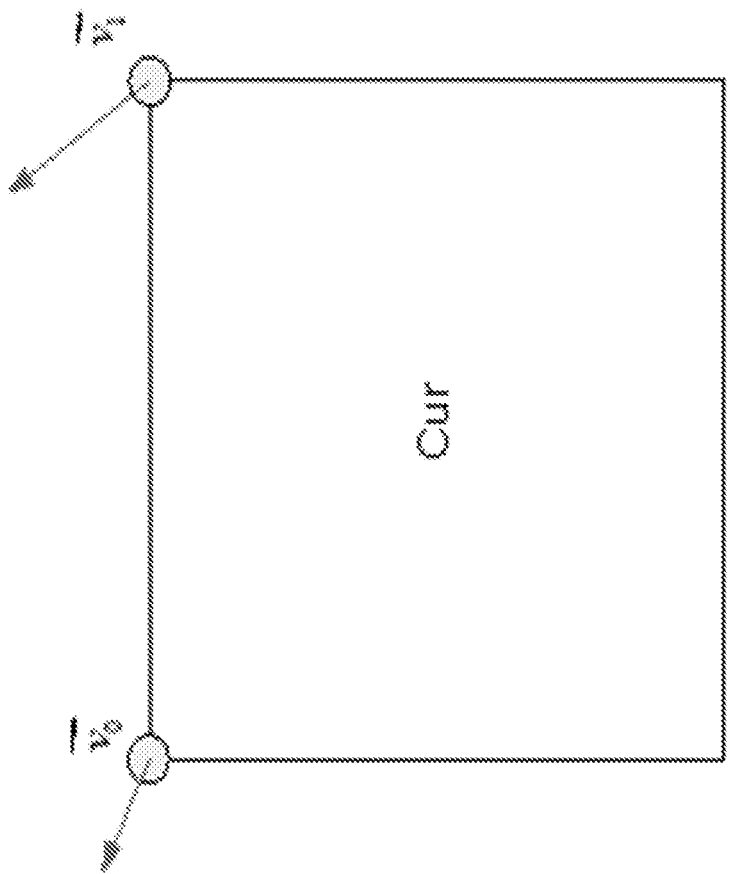
FIG. 3 shows an example of a simple affine model used in the Joint Exploration Model.

The motion model used is illustrated by FIG. 3. The affine motion field consists in the following motion vector component values for each position (x,y) inside the considered block:

Equation 1:

affine model used to generate the motion field inside a $CU$ to predict $$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

Coordinates $(v_{0x}, v_{0y})$ and $(v_{1x}, v_{1y})$ are the so-called control point motion vectors vused to generate the affine motion field. The point $(v_{0x}, v_{0y})$ is the motion vector top-left corner control point and $(v_{1x}, v_{1y})$ is the motion vector top-right corner control point.

Figure 4:
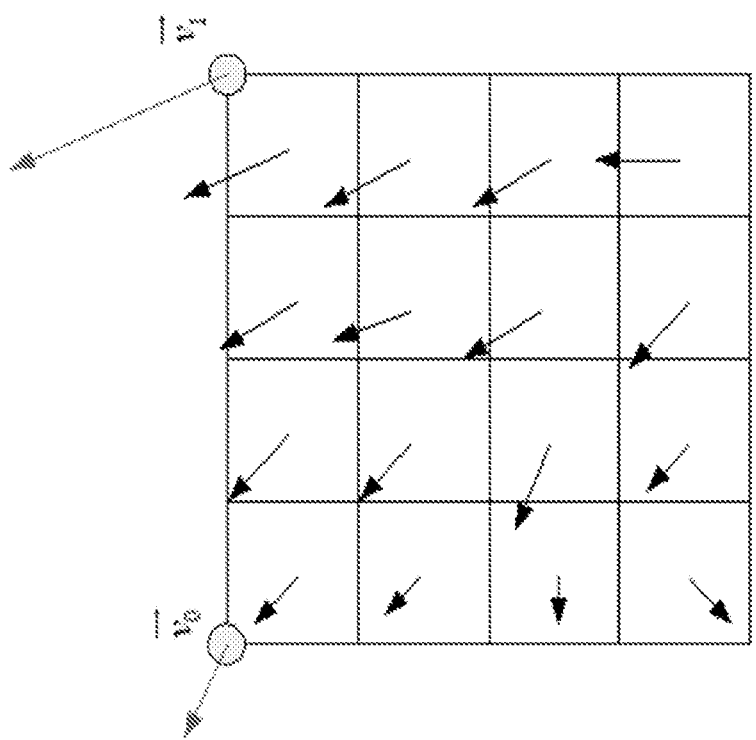
FIG. 4 shows an example of a 4×4 sub-CU based affine motion vector field.

In practice, to keep complexity reasonable, a motion vector is computed for each 4×4 sub-block (sub-CU) of the considered CU, as illustrated on FIG. 4. An affine motion vector is computed from the control point motion vectors, at the position of the center of each sub-block. The obtained MV is represented at 1/16-pixel accuracy.

As a result, the temporal coding of a coding unit in the affine mode consists in motion compensated predicting each sub-block with its own motion vector.

Note that a model with three control points is also possible.

Affine motion compensation can be used in three ways in the VTM: Affine Inter (AF_INTER), Affine Merge and Affine Template. They are introduced in the following:

Affine Inter (AF_INTER).

Figure 5:
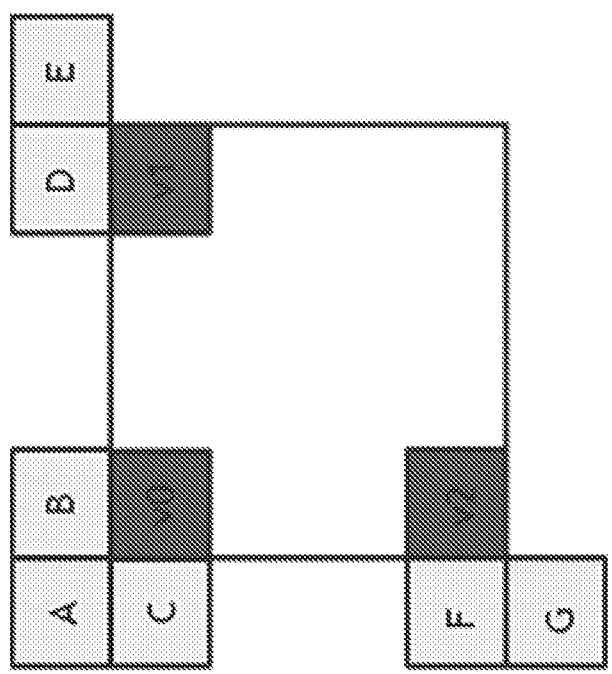
FIG. 5 shows an example of motion vector prediction process for affine inter CUs.
Figure 6:
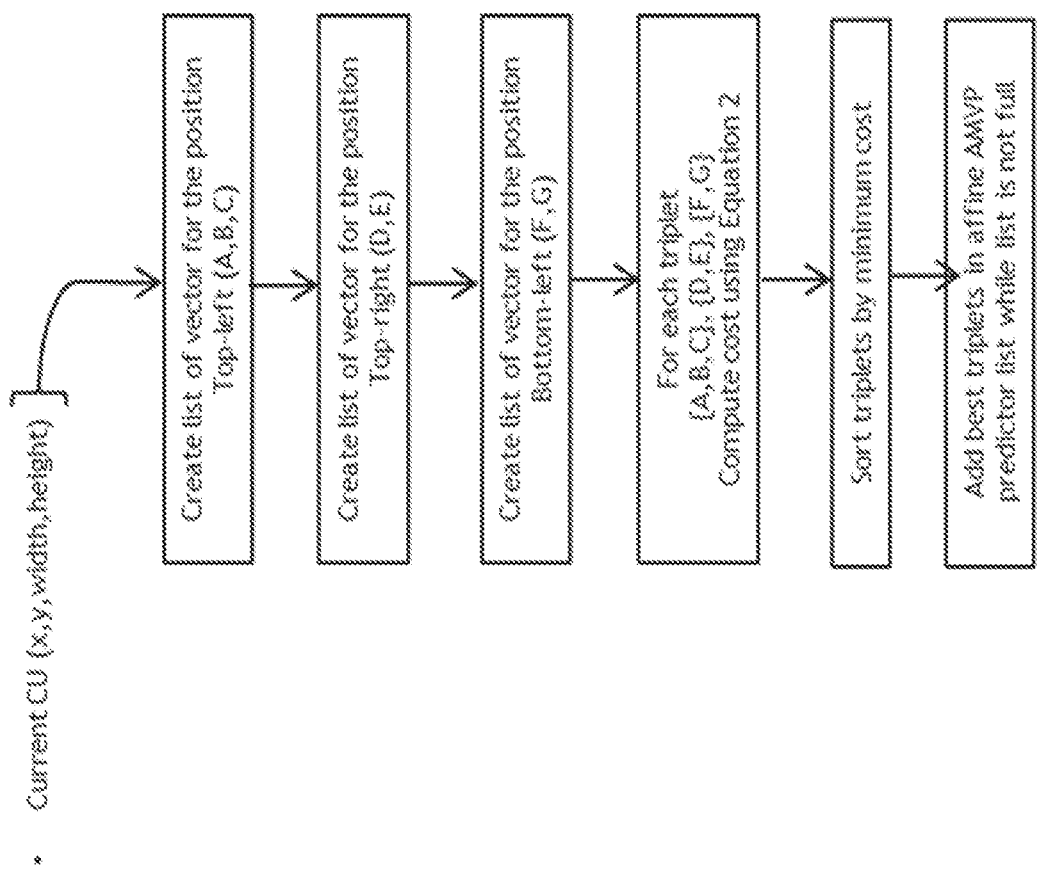
FIG. 6 shows an example flowchart of a process for creating new candidates in an affine AMVP process.

A CU in AMVP mode, having size larger than 8×8, can be predicted in Affine Inter mode. This is signaled through a flag in the bit-stream. The generation of the Affine Motion Field for that inter CU includes determining control point motion vectors (CPMV), which are obtained by the decoder through the addition of a motion vector difference and a control point motion vector prediction (CPMVP). The CPMVP is a pair of motion vector candidates, respectively taken from the list (A, B, C) and (D, E), as illustrated in FIG. 5.

Up to 6 CPMVP may be obtained (3 for $\vec{v_0}$ multiplied by 2 for $\vec{v_1}$).

First CPMVP are checked for validity using Equation 2, for a block of height H and Width W:

Equation 2 : Validity test for each $CPMVP$ $\overrightarrow{\Delta Hor} = \vec{v1} - \vec{v0}$ $DiffH = \frac{W}{2}$ $DiffV = \frac{H}{2}$ validity =

$\overrightarrow{\Delta Hor}! = \vec{0} \,\&\&\, abs(\overrightarrow{\Delta Hor}.X) \leq DiffH \,\&\&\, abs(\overrightarrow{\Delta Hor}.Y) \leq DiffV \,\&\&$
$abs(\overrightarrow{\Delta Ver}.X) \leq DiffH \,\&\&\, abs(\overrightarrow{\Delta Ver}.Y) \leq DiffV)$ Valid CPMVP are then sorted depending on the value of a third motion vector $\vec{v_2}$, (taken from position F or G). The closest $\vec{v_2}$ is to the vector given by the affine motion model for the 4×4 sub-block at the same position as $\vec{v_2}$, the better is the CPMVP.

For a block of Height H and Width W, the cost of each CPMVP is computed with Equation 3. In the following equation X and Y are respectively the horizontal and vertical components of a motion vector.

Equation 3: Cost computed for each CPMVP $$\overrightarrow{\Delta Hor} = \overrightarrow{v1} - \overrightarrow{v0}$$

$$\overrightarrow{\Delta Ver} = \overrightarrow{v2} - \overrightarrow{v0}$$

$$cost = abs(\overrightarrow{\Delta Hor}.X * H - \overrightarrow{\Delta Ver}.Y * W) + abs(\overrightarrow{\Delta Hor}.Y * H + \overrightarrow{\Delta Ver}.X * W)$$

Affine Merge

Figure 7:
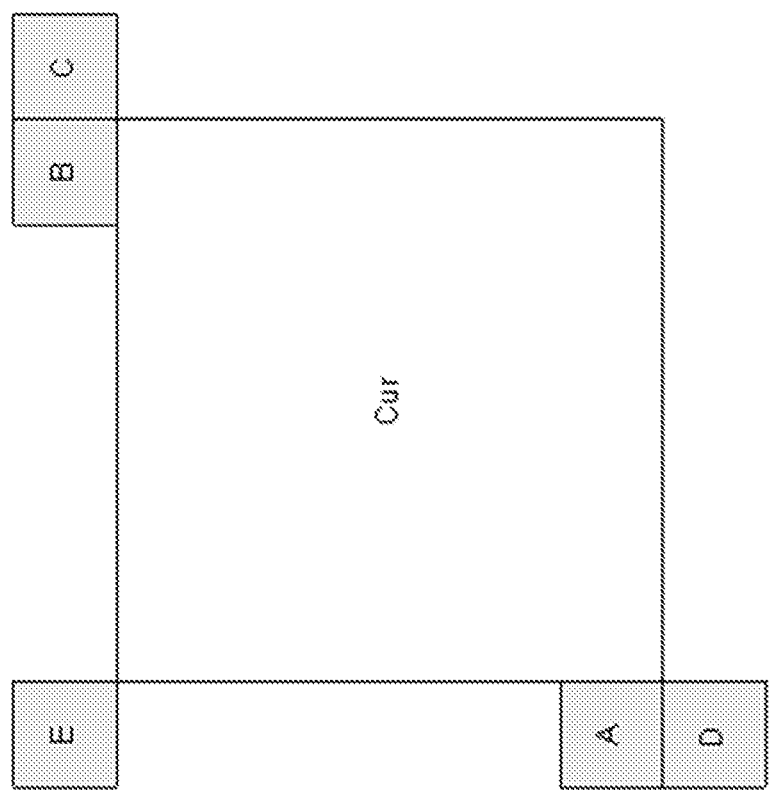
FIG. 7 shows an example of motion vector prediction candidates in an affine merge mode.

In Affine Merge mode, a CU-level flag indicates if a merge CU employs affine motion compensation. If so, then the first available neighboring CU that has been coded in an Affine mode is selected among the ordered set of candidate positions (A, B, C, D, E) of FIG. 7.

Figure 8:
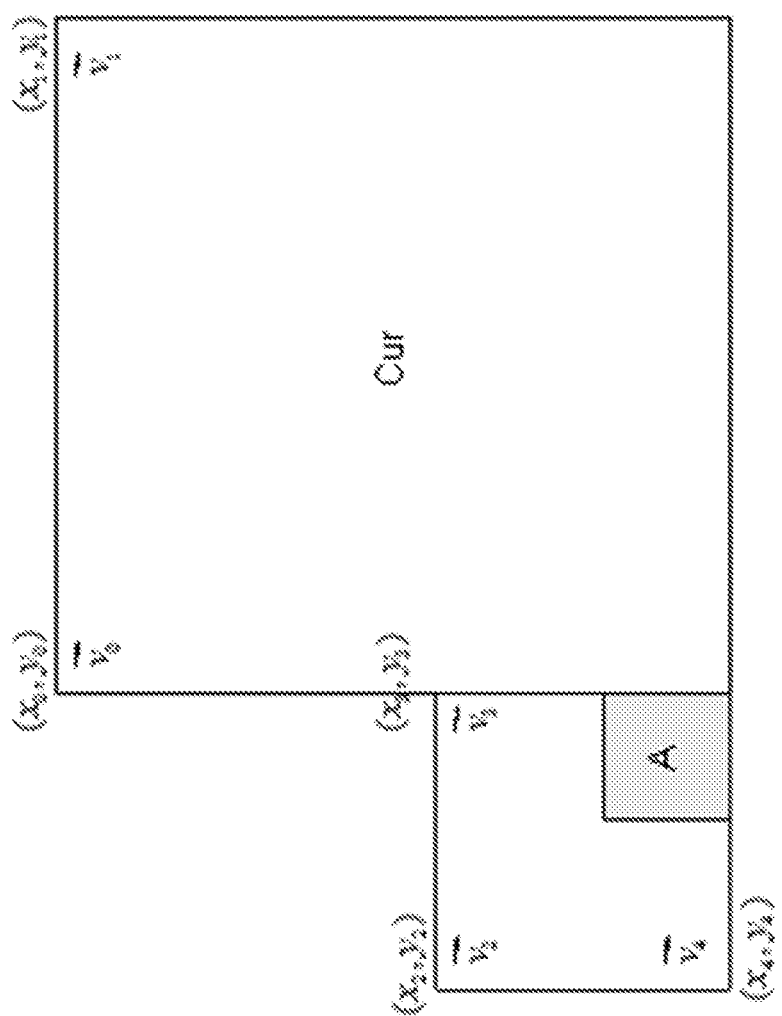
FIG. 8 shows an example of spatial derivation of affine motion field control points for affine merge mode.

Once the first neighboring CU in Affine mode is obtained, then the 3 motion vectors $\vec{v}_2$, $\vec{v}_3$, and $\vec{v}_4$ from the top-left, top-right and bottom-left corners of the neighboring CU are retrieved (see FIG. 8). Based on these three vectors, the two CPMV of the top-left and top-right corners of current CU are derived as follows:

Equation 4: derivation of current CU's CPMV based on
the three corner motion vectors of the neighboring CU $$\circ \quad \vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$

$$\circ \quad \vec{v_1} = \vec{v_0} + (\vec{v_3} - \vec{v_2})\left(\frac{W_{curr}}{W_{neighb}}\right)$$

When the control point motion vectors $\vec{v}_0$ and $\vec{v}_1$ of a current CU are obtained, the motion field inside the current CU is computed on a 4×4 sub-CU basis, through the model of Equation 1.

In a prior work, more candidates are added for Affine merge mode, selecting the best candidate among a maximum of 7 candidates and coding the index of the best candidate in the bitstream.

Another type of candidate is called temporal affine:

Similar to TMVP (Temporal Motion Vector Predictor) candidates, affine CU are searched in reference images and added to the candidates list.

Figure 9:
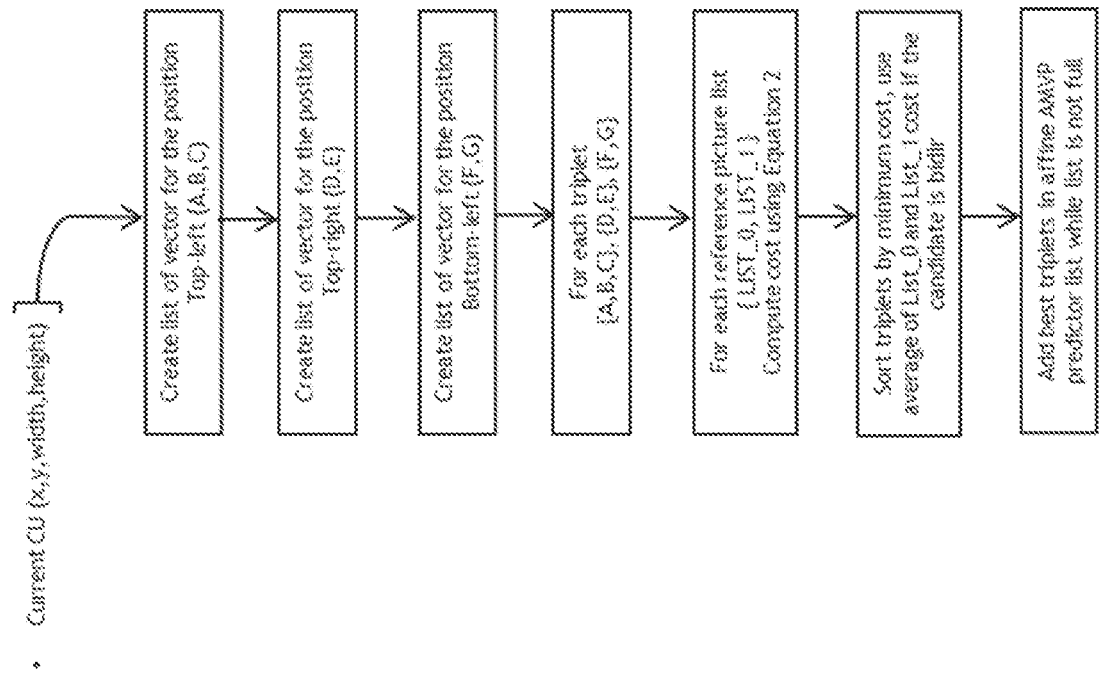
FIG. 9 shows an example of a flowchart for creating new affine candidates.

In another work, a new process to create "virtual" candidates are added (see FIG. 9). The motivation is to create affine candidates when no affine CU are available around the current CU. To do so, an affine model is created by taking the motion of individual sub-blocks at the corner and creating an "affine" model.

During the candidate list creation, there are 2 constraints to consider for complexity reasons:

The total number of potential candidates: increase the total computation need

The final list size: increase the delay at decoder by increasing the number of comparisons needed for each successive candidate Currently, the virtual affine candidates are added to the list of potential candidates by taking candidates at the corners A, B, C and sort the candidates using equation 2.

One problem solved by the general aspects described herein is to enable the creation of more virtual temporal affine candidates, but to filter each candidate to keep the final candidate list small and filled with relevant candidates.

In current versions of JEM or VTM, there is no affine temporal candidate. In a prior work, virtual affine temporal candidates were proposed, and they are currently being studied.

One basic idea of the proposed aspects described is enriching the set of virtual affine candidates (both spatial and temporal), optionally replacing inherited affine candidates, and filtering or refining them to keep a list of relevant affine candidates. This process can result in a subset of affine candidates or the entire set.

Compared to the previous process of creating a virtual affine candidate:

More candidates are created

To keep a list of relevant candidates, each candidate is filtered, or the list is refined Spatial and temporal candidates can be interlaced.

Figure 10:
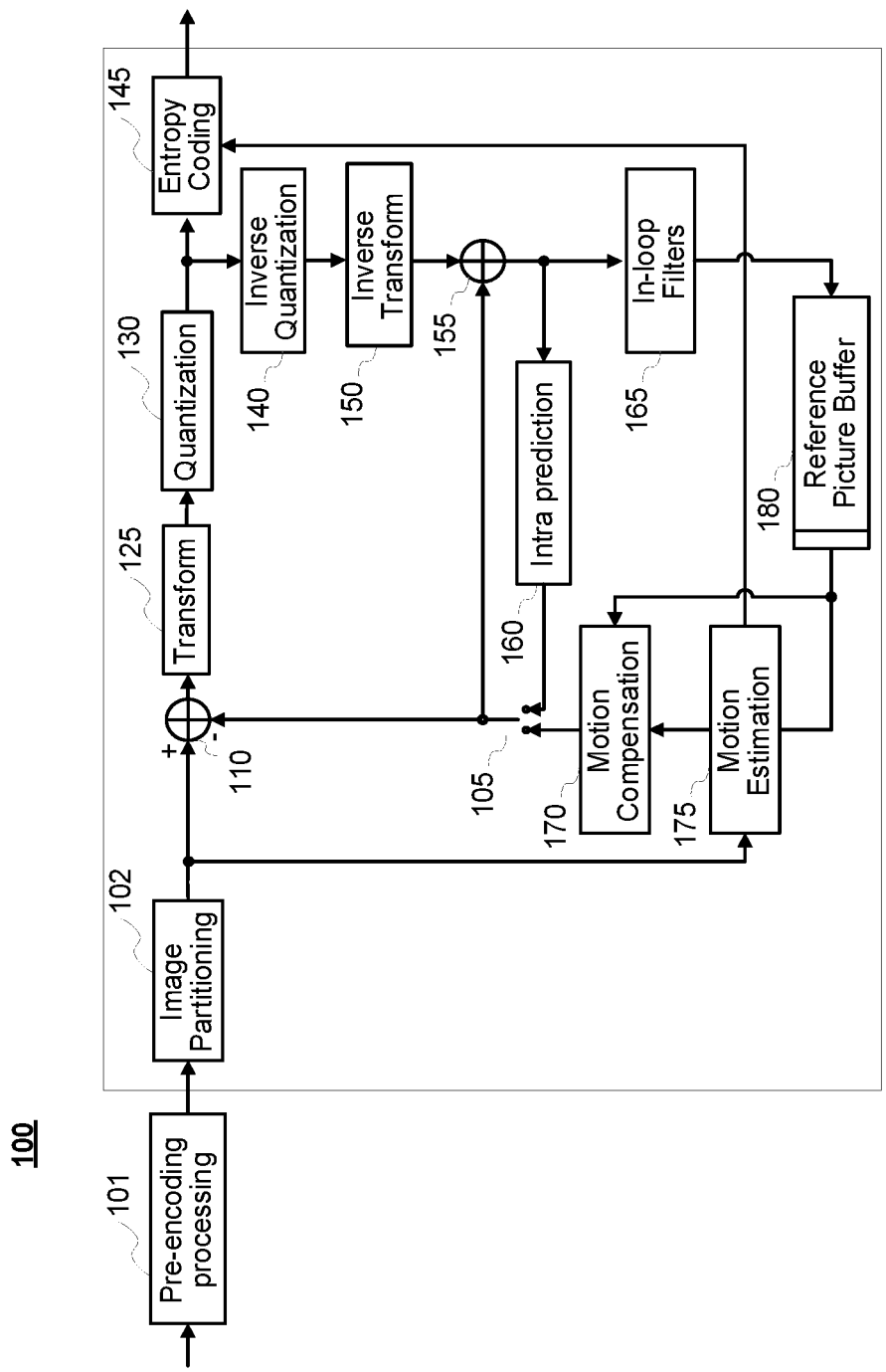
FIG. 10 shows a standard, generic, video compression scheme.
Figure 11:
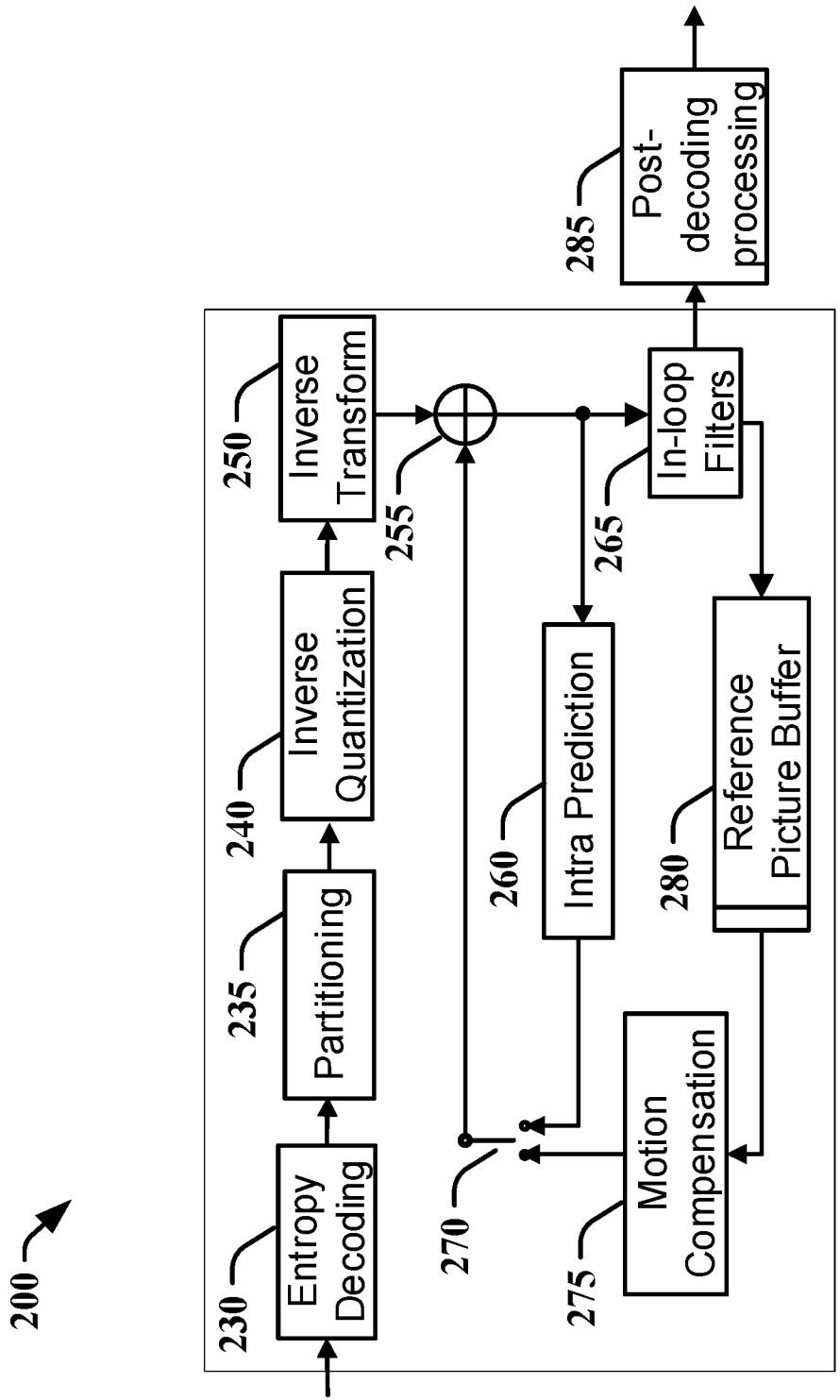
FIG. 11 shows a standard, generic, video decompression scheme.

The impacted codec modules are the motion estimation 175 of FIG. 10 and the motion compensation 170 of FIG. 10 and 275 of FIG. 11.

Figure 12:
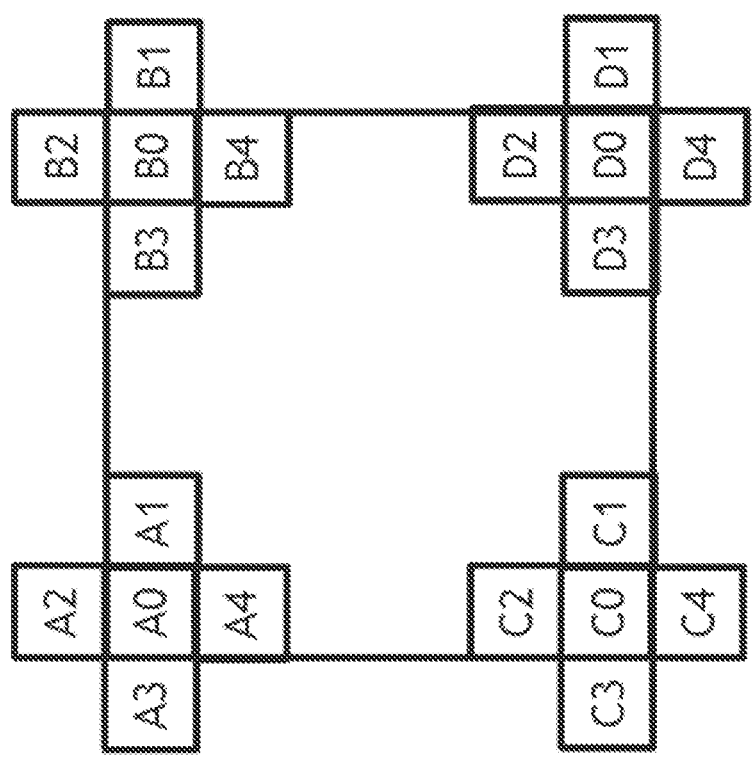
FIG. 12 shows an example of virtual temporal candidate sub-blocks.
Figure 13:
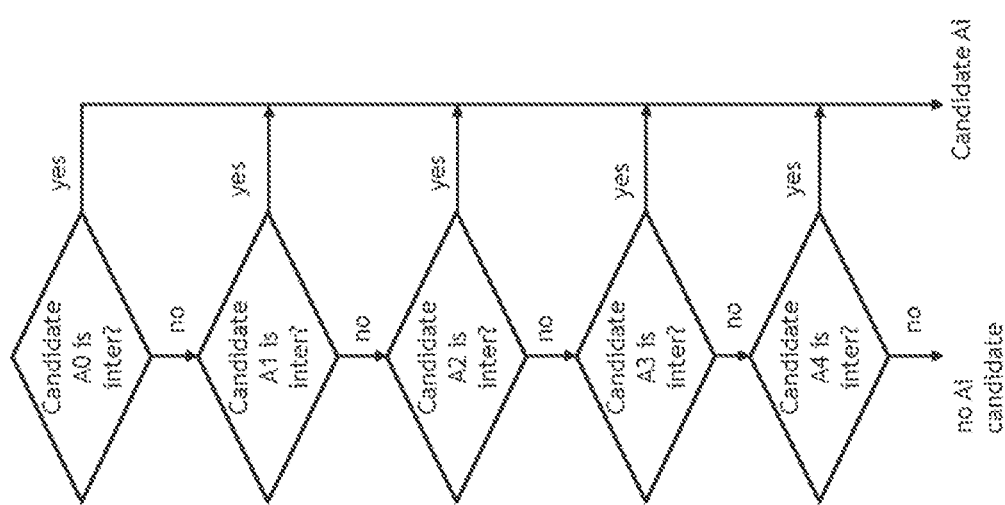
FIG. 13 shows an example flow diagram for a process to select a corner sub-block.

FIG. 12 shows the sub-block used to compute the virtual affine model. For each corner A, B, C, D, the process described in FIG. 13 is applied: the sub-blocks are examined in order from 0 to 1. Once a valid sub-block is found (i.e. a sub-block with a motion vector), it is used to compute the affine model. Note that in the case of spatial affine candidate, some sub-blocks are never available (e.g. block 0). The computation of the full affine model from some corners is the same as the current virtual spatial candidates. Typically, the affine model can be either 3, 4 or 6 parameters. The parametrization is usually done by giving the motion vectors associated with some corners of the current PU.

Note: The order can be different from A0, A1, . . . A4 but is fixed between coder and decoder.

Figure 14:
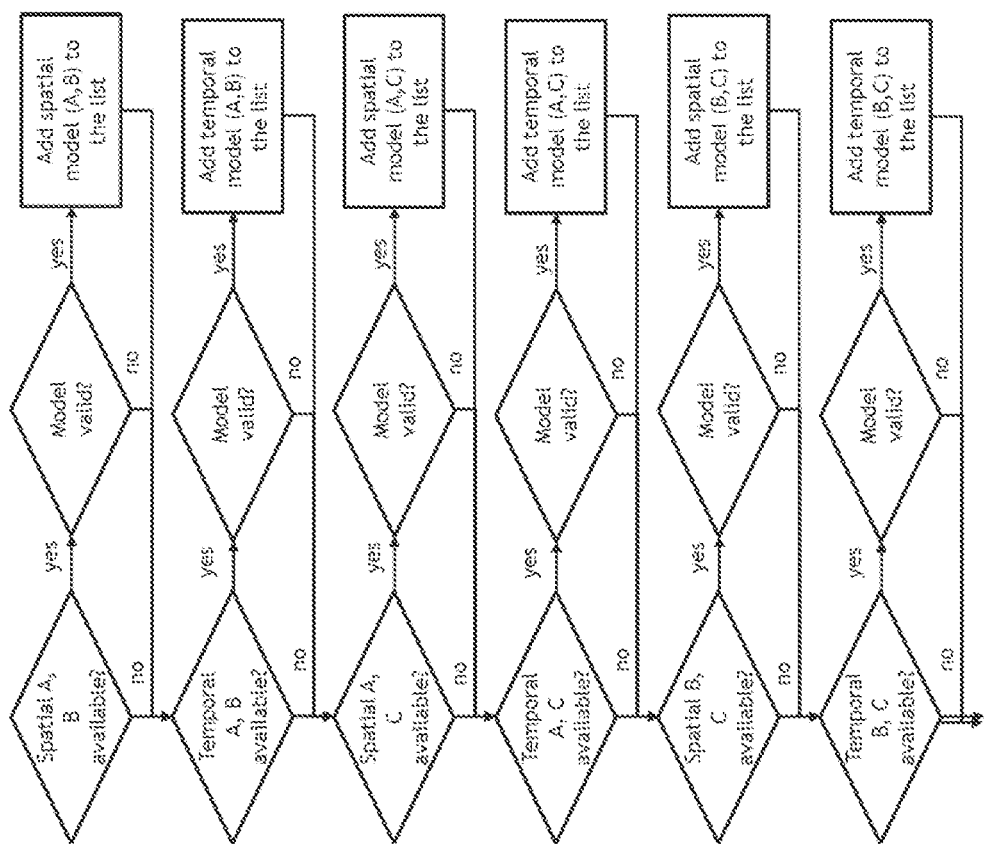
FIG. 14 shows an example flow diagram for a process of affine model computation.

FIG. 14 shows an example process to compute the resulting affine model for a 4 parameters affine model, with picking only corners A, B and C. The list of models is:

Spatial model (A,B)
Temporal model (A,B)
Spatial model (A,C)
Temporal model (A,C)
Spatial model (B,C)
Temporal model (B,C)

Alternatively, adding corner D adds the following candidates:

Temporal model (B,D)
Temporal model (C,D)
Temporal model (A,D)

Alternatively, for a 6 parameters affine model, up to 3 corners can be used together:

Spatial model (A,B,C)
Temporal model (A,B,C)
Temporal model (A,B,D)
Temporal model (B,C,D)

The temporal candidates are interlaced with the spatial candidates.

In all cases, when a corner is missing, it can be reconstructed if other corners are available as described in PCT/US18/054318, "Affine Model Candidates for Affine Motion Prediction.

Figure 15:
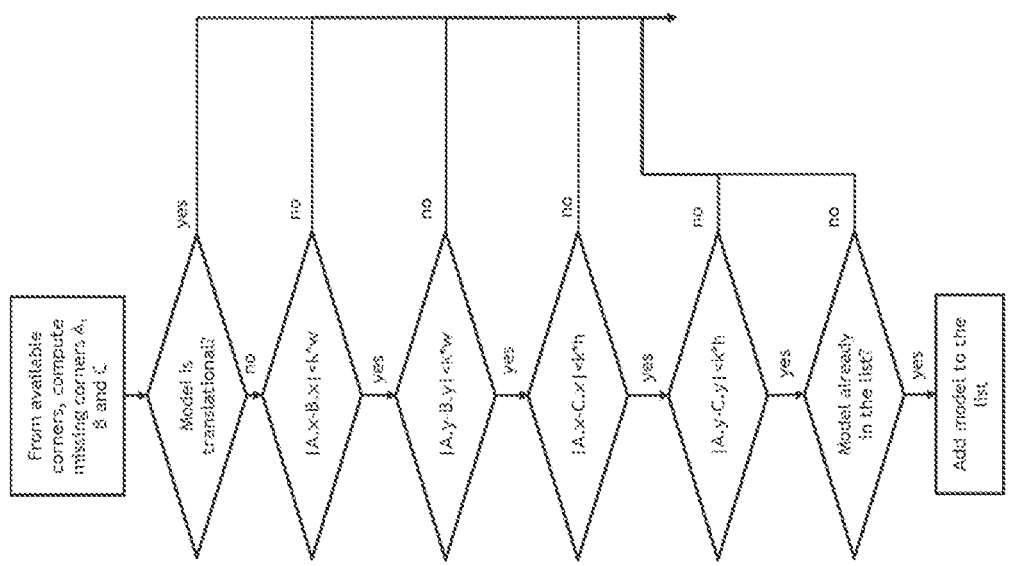
FIG. 15 shows an example flow diagram for a process for candidate validation.

In FIG. 14, the model validity is defined as depicted in FIG. 15 for an affine model with 6 parameters (note that it is also valid for a 4 parameters model).

In FIG. 15, the translational model test is true when motion vector at A, B and C are equal for BOTH L0 and L1 list. If only one affine model (in either L0 or L1 list) is translational, the model is considered affine. If the PU is uni-directional, then the model is translational if the unique affine model is translational.

The validation process first checks that the affine model does not induce large motion difference between all corners (first 4 tests). In the test, A, B and C denote the corners as shown in FIG. 12, A.x and A.y denote the motion vector on x and y axes respectively. The values h and w denote the PU height and width, and k is a fixed constant (for example, k=8 for high precision motion vector with 1/16th pixel accuracy).

The model is then compared to the models already in the list as usual. If the model passes all tests, the model is added to the list.

To improve the diversity of the affine model list, more virtual models can be created.

Figure 16:
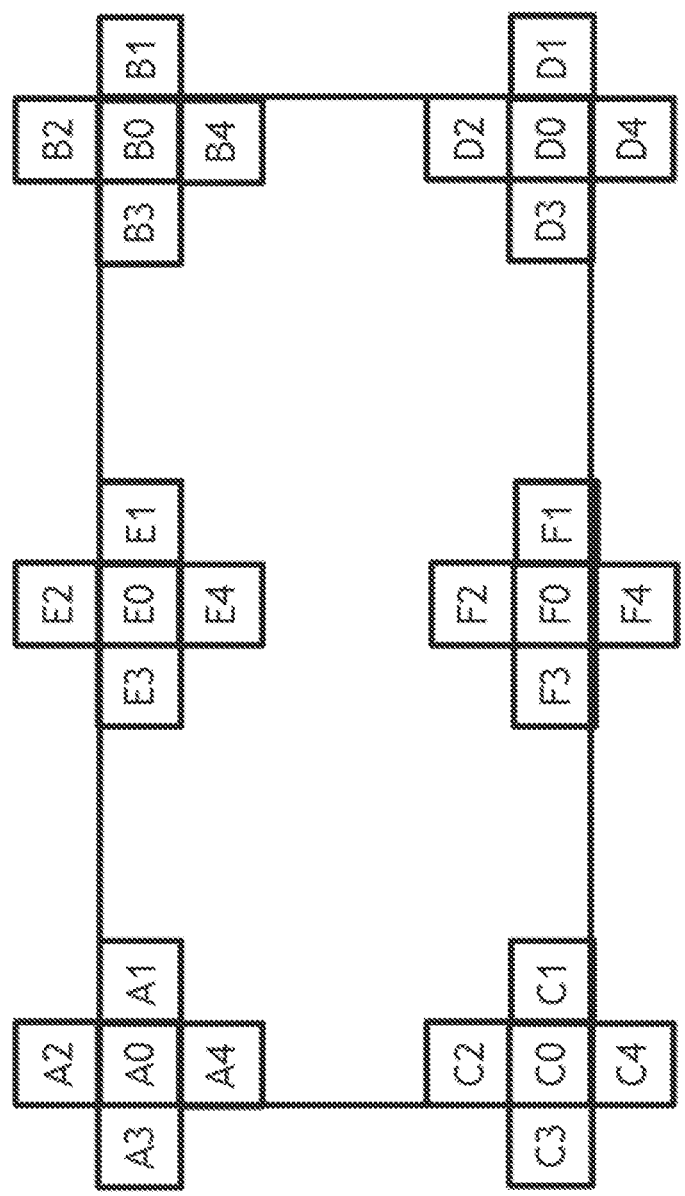
FIG. 16 shows an example of additional motion vector data.

FIG. 16 shows an example of additional motion vector data Ex and Fx used to derive a virtual affine model.

Motion vectors located in the middle of the first and last rows are potential motion vectors to create an affine model. Such candidates are created if the block width (or height, respectively) is larger than a threshold D. Typically, D is fixed to 32 pixels. In FIG. 16, the block width is supposed to be 32 and the block height 16. In the case both height and width are larger than D, more potential motion vector data are added in both first/last rows and first/last columns.

Figure 17:
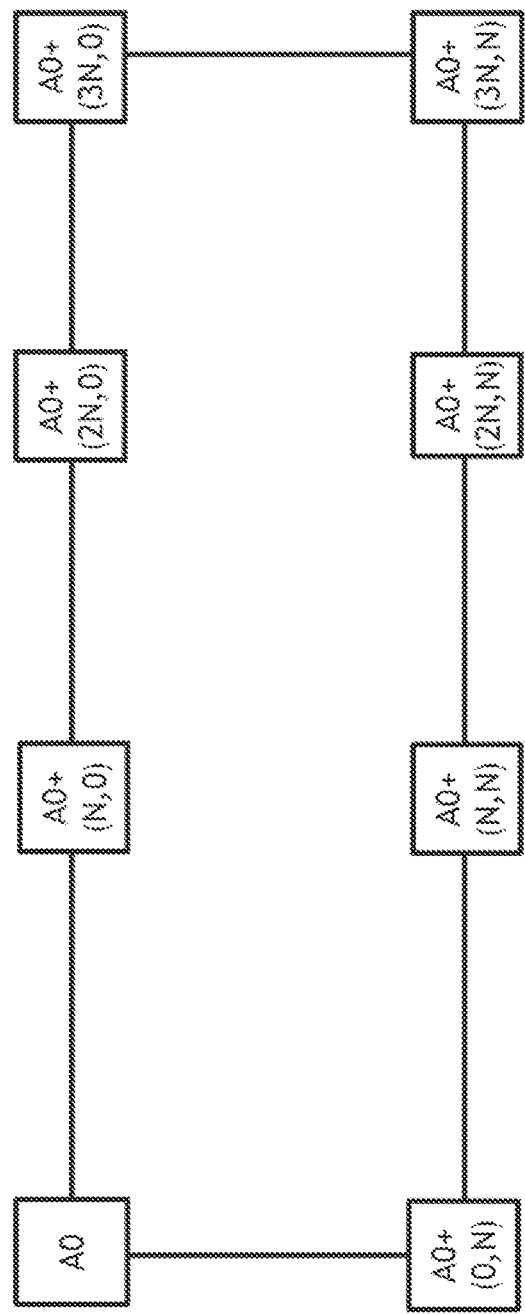
FIG. 17 shows an example of locations of potential motion vector data for a 48×16 block with a step of N=16.

Alternatively, additional candidate motion vectors are located every N pixels, where N is typically fixed to 16 pixels. In this case, for a block 48×16, the resulting motion vector sub-block locations are shown in FIG. 17.

For clarity, only the center motion vector data is shown. For a spatial affine model, motion vector data is located outside the PU, whereas for temporal affine model, the motion vector can be taken inside the PU.

In the figure, the motion vector data are designated by their relative coordinate to the motion vector A0: V=A0+ (u*N,v*N) where u is between 0 and w/N and v between 0 and h/N.

Figure 18:
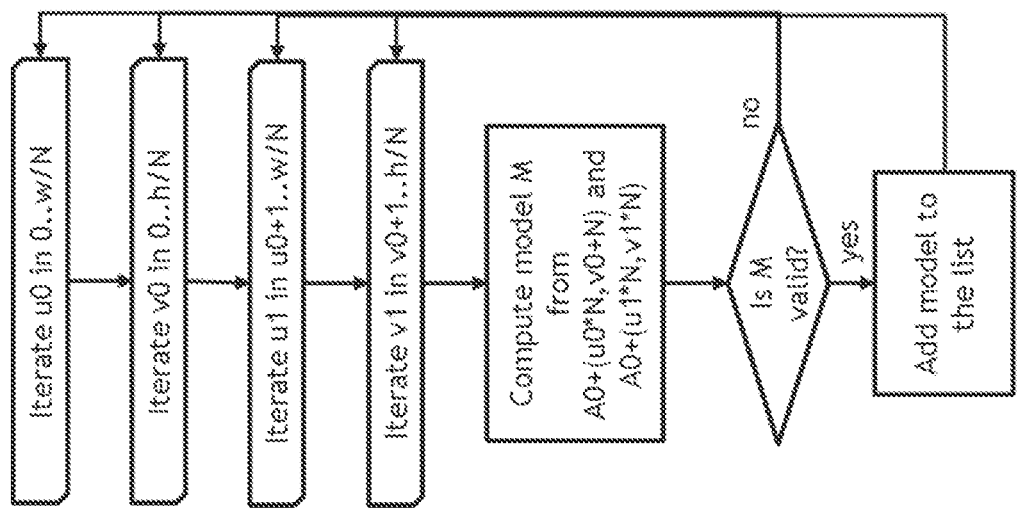
FIG. 18 shows an example flow diagram for additional affine model creation.
Figure 19:
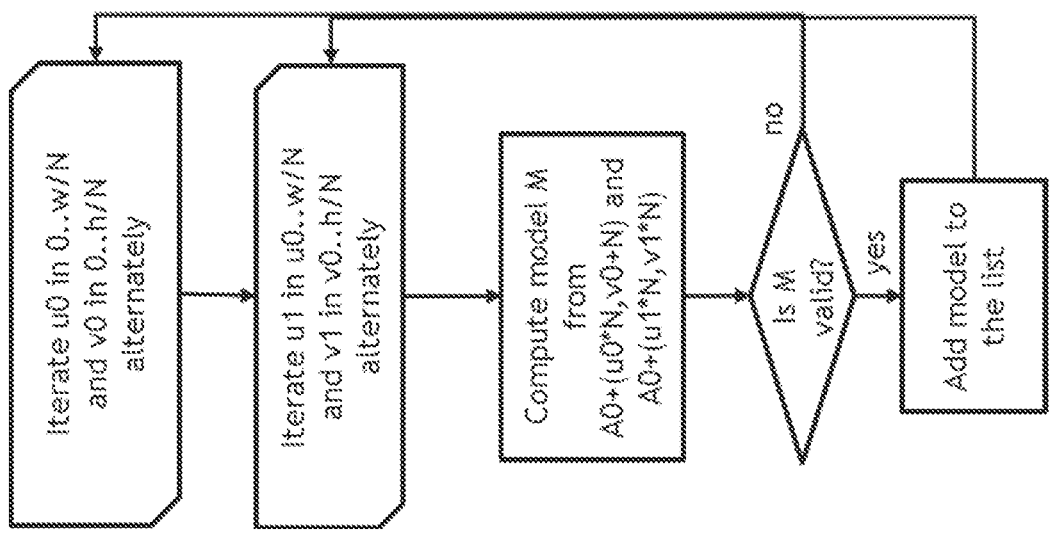
FIG. 19 shows an example flow diagram for a variation of additional model creation.

The list of derived motion models is formed by iterating over each potential motion vector data. FIG. 18 and FIG. 19 show exemplary processes to extract the list of potential affine models of 4 parameters (hence parametrized by control points). The process iterates over the motion vector data and forms corner pairs. In the variant, the corner locations' x and y coordinates are iterated alternately.

When a motion vector data is not available, or when the pairs are on the same motion vector data, the potential candidate is skipped. Note that in spatial affine model, all motion vector data are taken on the border of the PU, whereas in temporal affine model, the motion vector data can be taken inside the PU.

Figure 20:
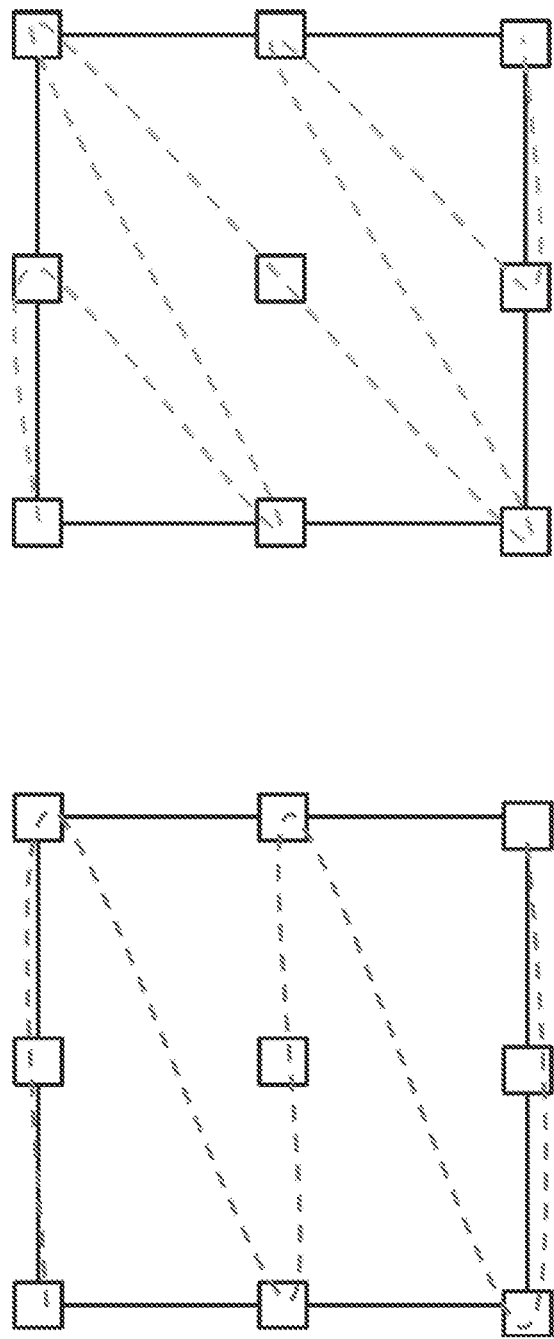
FIG. 20 shows an example of motion vector data selection for corners in an iterate loop (left) and an iterate alternately (right).

FIG. 20 shows the path of motion vector data selection corresponding to FIG. 18 (left figure: raster scan) and FIG. 19 (right side: zigzag-scan).

Figure 21:
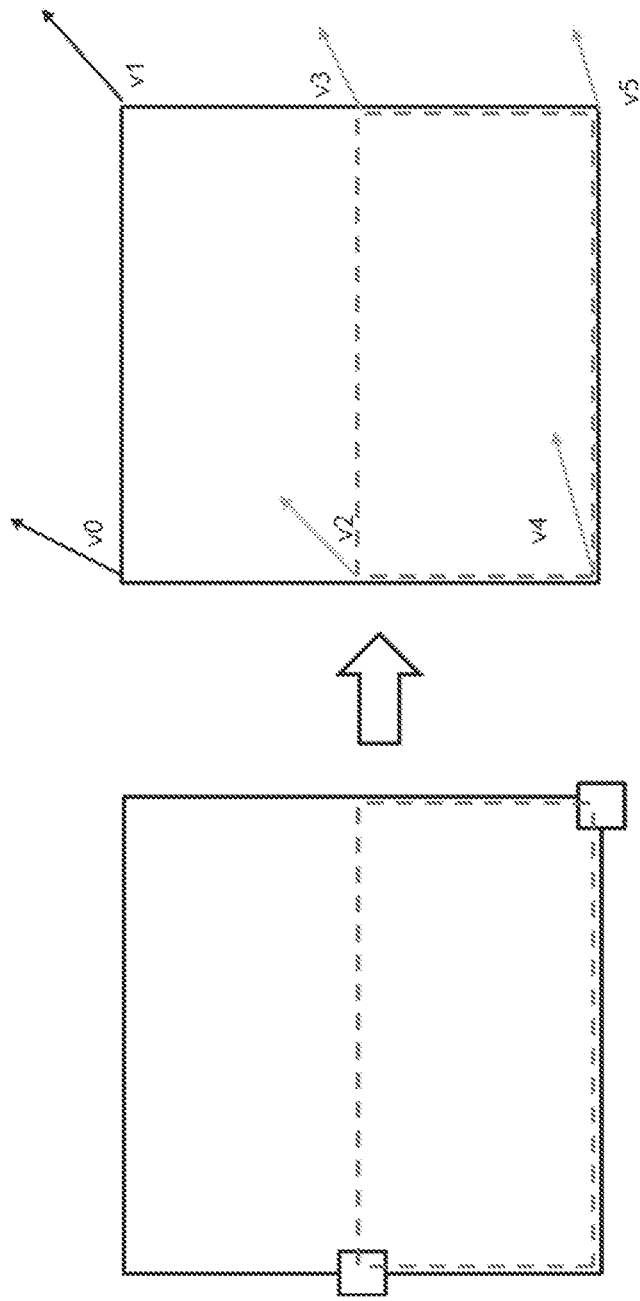
FIG. 21 shows an example of an example of control point motion vector model derivation.

The derivation of the motion model is done by applying the motion model transfer similarly to the process described by equation 4. For example, in FIG. 21, the affine model represented as (v0, v1) is computed by using vectors (v2, v3, v4) as in equation 4. First, vectors v3 and v4 are deduced from motion vector data v2 and v5, then the model is transferred using the same principle, considering the neighbor PU as the PU formed by the 2 motion vector data corners.

Figure 23:
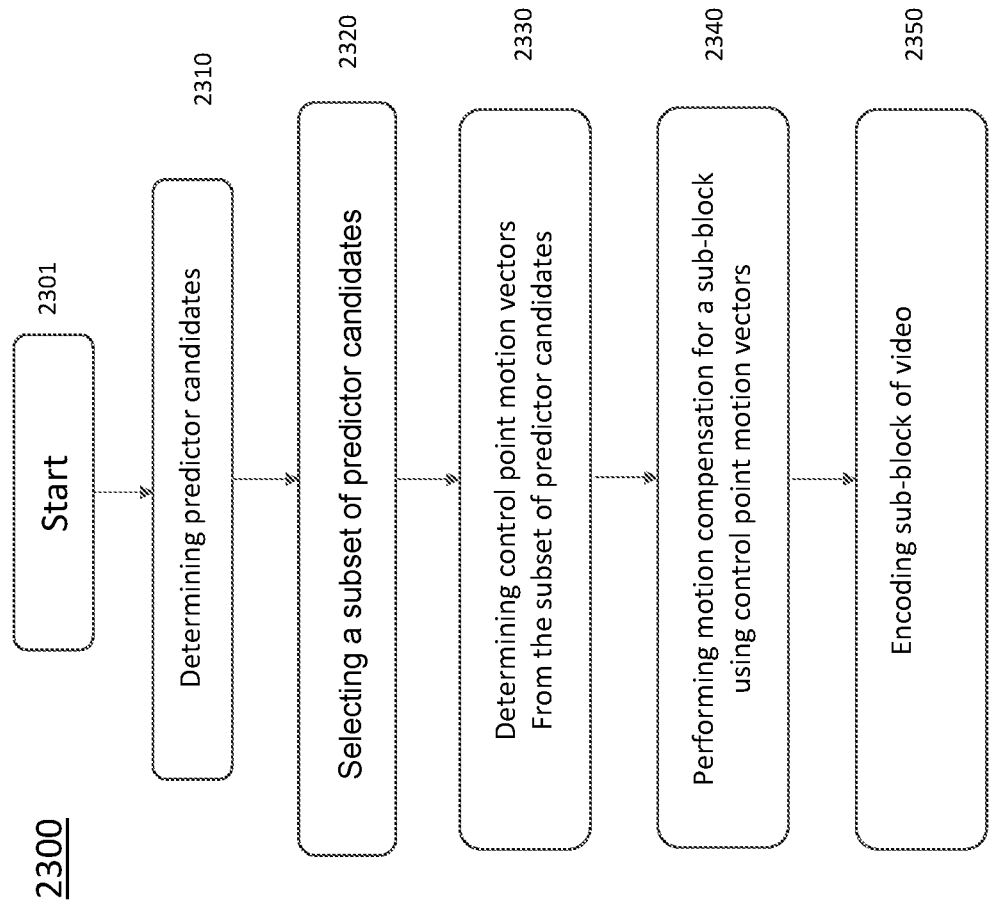
FIG. 23 shows one embodiment of a method of encoding using the general aspects described herein.

One embodiment of a method 2300 under the general aspects described here is shown in FIG. 23. The method commences at start block 2301 and control proceeds to block 2310 for determining for a sub-block of a video block being encoded in a picture, a plurality of predictor candidates from among neighboring sub-blocks and at least one reference picture. Control proceeds from block 2310 to block 2320 for selecting a subset of the plurality of predictor candidates. Control proceeds from block 2320 to block 2330 for determining from the subset of predictor candidates, one or more control point motion vectors for the video block. Control proceeds from block 2330 to block 2340 for performing affine motion compensation for the sub-block of the video block being encoded using the one or more control point motion vectors. The motion compensation process can include determining a motion vector field for the sub-block from the control point motion vectors. Control proceeds from block 2340 to block 2350 for encoding the sub-block of the video block.

Figure 24:
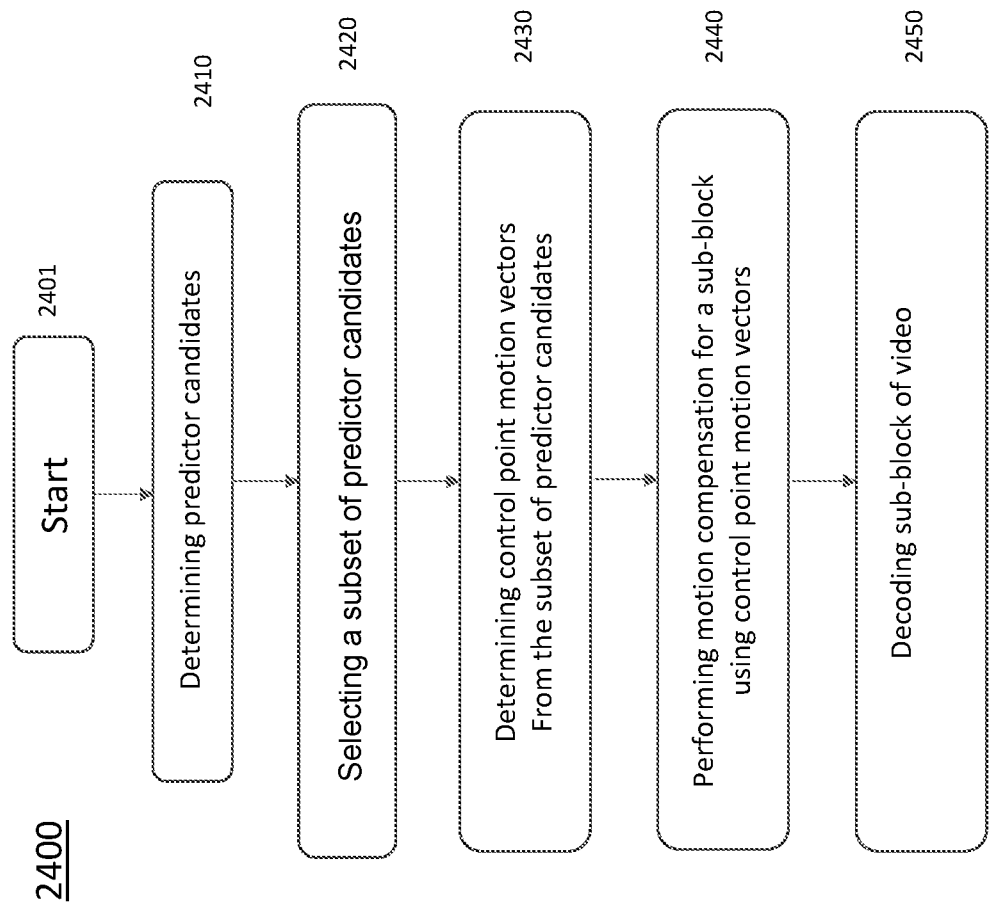
FIG. 24 shows one embodiment of a method of decoding using the general aspects described herein.

One embodiment of a method 2400 under the general aspects described here is shown in FIG. 24. The method commences at start block 2401 and control proceeds to block 2410 for determining for a sub-block of a video block being decoded in a picture, a plurality of predictor candidates from among neighboring sub-blocks and at least one reference picture. Control proceeds from block 2410 to block 2420 for selecting a subset of the plurality of predictor candidates. Control proceeds from block 2420 to block 2430 for determining from the subset of predictor candidates, one or more control point motion vectors for the video block. Control proceeds from block 2430 to block 23440 for performing affine motion compensation for the sub-block of the video block being decoded using the one or more control point motion vectors. The motion compensation process can include determining a motion vector field for the sub-block from the control point motion vectors. Control proceeds from block 2440 to block 2450 for decoding the sub-block of the video block.

FIG. 25 shows one embodiment of an apparatus 2500 for compressing, encoding or decoding video using improved virtual temporal affine candidates. The apparatus comprises Processor 2510 and can be interconnected to a memory 2520 through at least one port. Both Processor 2510 and memory 2520 can also have one or more additional interconnections to external connections.

Processor 2510 is also configured to either insert or receive information in a bitstream and, either compressing, encoding or decoding using interpolation filters.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all the different aspects can be combined and interchanged to provide further aspects. Moreover, the aspects can be combined and interchanged with aspects described in earlier filings as well.

Figure 22:
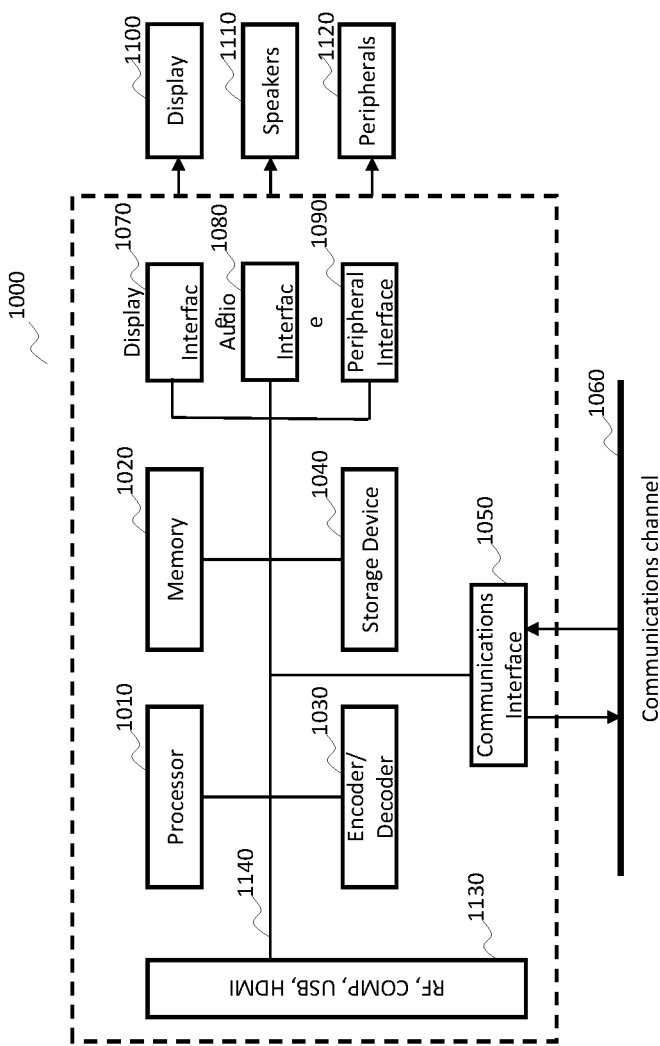
FIG. 22 shows one embodiment of a system for encoding or decoding using the general aspects described herein.

The aspects described and contemplated in this document can be implemented in many different forms. FIGS. 10, 11 and 22 below provide some embodiments, but other embodiments are contemplated and the discussion of FIGS. 10, 11 and 22 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

The input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 22 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Creating additional virtual affine candidates.

Filtering of virtual affine candidates.

Addition of filtered virtual affine candidates to a candidate list.

A bitstream or signal that includes one or more of the described syntax elements, or variations thereof.

Creating and/or transmitting and/or receiving and/or decoding a bitstream or signal that includes one or more of the described syntax elements, or variations thereof.

ATV, set-top box, cell phone, tablet, or other electronic device that performs in-loop filtering according to any of the embodiments described.

ATV, set-top box, cell phone, tablet, or other electronic device that performs in-loop filtering according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs in-loop filtering according to any of the embodiments described.

A TV, set-top box, cell phone, tablet, or other electronic device that receives (e.g. using an antenna) a signal over the air that includes an encoded image, and performs in-loop filtering according to any of the embodiments described.

Various other generalized, as well as particularized, embodiments, aspects, and claims are also supported and contemplated throughout this disclosure.

The invention claimed is:

1. A method, comprising:
   determining, for a sub-block of a video block being encoded in a picture, a plurality of predictor candidates from among spatially neighboring sub-blocks and at least one temporal reference picture;
   selecting a subset of the plurality of predictor candidates after replacing affine candidates with refined virtual affine candidates to keep a list of relevant affine candidates
   when said affine model induces no motion difference between all corners of said video block and said affine model is not translational;
   determining from the subset of predictor candidates, one or more control point motion vectors for the video block;
   performing affine motion compensation for the sub-block of the video block being encoded using the one or more control point motion vectors; and,
   encoding the sub-block of the video block.

2. The method of claim 1, wherein said selecting a subset of the plurality of predictor candidates comprises:
   performing a validation check on said plurality of predictor candidates to determine whether an affine model does not cause an amount of motion difference between corners of said block, and
   conditionally adding at least one of said plurality of prediction candidates to a set of predictor candidates based on at least said validation check.

3. The method of claim 2, further comprising encoding at least one index for the added predictor candidates from the set of predictor candidates.

4. A non-transitory computer readable medium containing data content generated according to the method of claim 1, for playback using a processor.

5. A computer program product stored in a non-transitory computer readable storage medium comprising instructions which, when the program is executed by a computer, cause the computer to carry out the method of claim 1.

6. The method of claim 1, wherein motion vectors located in a first and last row are used as motion vectors to create an affine model when a block width or height is larger than a threshold.

7. The method of claim 1, wherein when height and width are larger than a threshold, motion vector data are added in both first/last rows and first/last columns.

8. An apparatus, comprising:
   a processor, configured to perform:
   determining, for a sub-block of a video block being encoded in a picture, a plurality of predictor candidates from among spatially neighboring sub-blocks and at least one temporal reference picture;
   selecting a subset of the plurality of predictor candidates after replacing affine candidates with refined virtual affine candidates to keep a list of relevant affine candidates
   when said affine model induces no motion difference between all corners of said video block and said affine model is not translational;
   determining from the subset of predictor candidates, one or more control point motion vectors for the video block;
   performing affine motion compensation for the sub-block of the video block being encoded using the one or more control point motion vectors; and,
   encoding the sub-block of the video block.

9. The apparatus of claim 8, wherein said selecting a subset of the plurality of predictor candidates comprises replacing inherited affine candidates with virtual candidates.

10. A method, comprising:
    determining, for a sub-block of a video block being decoded in a picture, a plurality of predictor candidates from among spatially neighboring sub-blocks and at least one temporal reference picture;
    selecting a subset of the plurality of predictor candidates after replacing affine candidates with refined virtual affine candidates to keep a list of relevant affine candidates
    when said affine model induces no motion difference between all corners of said video block and said affine model is not translational;
    determining from the subset of predictor candidates, one or more control point motion vectors for the video block;
    performing affine motion compensation for the sub-block of the video block being decoded using the one or more control point motion vectors; and,
    decoding the sub-block of the video block.

11. The method of claim 10, wherein the affine motion compensation is performed using at least 3 parameters.

12. The method of claim 10, wherein motion vectors corresponding to locations in a first and a last row of said video block are used in an affine model.

13. A computer program product stored in a non-transitory computer readable storage medium comprising instructions which, when the program is executed by a computer, cause the computer to carry out the method of claim 10, for playback using a processor.

14. The method of claim 10, wherein said selecting a subset of the plurality of predictor candidates comprises:
    performing a validation check on said plurality of predictor candidates to determine whether an affine model does not cause an amount of motion difference between corners of said block, and
    conditionally adding at least one of said plurality of prediction candidates to a set of predictor candidates based on at least said validation check.

15. The method of claim 10, further comprising encoding at least one index for the added predictor candidates from the set of predictor candidates.

16. The method of claim 10, wherein said selecting a subset of the plurality of predictor candidates comprises replacing inherited affine candidates with virtual candidates.

17. The method of claim 10, wherein the affine motion compensation is performed using at least 3 parameters.

18. The method of claim 10, wherein motion vectors located in a first and a last row of said video block are used in an affine model.

19. The method of claim 10, wherein motion vectors located in a first and last row are used as motion vectors to create an affine model when a block width or height is larger than a threshold.

20. An apparatus, comprising:
    a processor, configured to perform:
    determining, for a sub-block of a video block being decoded in a picture, a plurality of predictor candidates from among spatially neighboring sub-blocks and at least one temporal reference picture;

selecting a subset of the plurality of predictor candidates after replacing affine candidates with refined virtual affine candidates to keep a list of relevant affine candidates when said affine model induces no motion difference between all corners of said video block and said affine model is not translational;

determining from the subset of predictor candidates, one or more control point motion vectors for the video block;

performing affine motion compensation for the sub-block of the video block being decoded using the one or more control point motion vectors; and, decoding the sub-block of the video block.

21. The apparatus of claim 20, wherein motion vectors corresponding to locations every N pixels of said video block are used in an affine model.

22. The apparatus of claim 20, wherein three corners of a video block are used for an affine model.

23. A device comprising:

an apparatus according to claim 20; and at least one of (i) an antenna configured to receive a signal, the signal including the video block, (ii) a band limiter configured to limit the received signal to a band of frequencies that includes the video block, and (iii) a display configured to display an output representative of a video block.

24. The method of claim 20, wherein when height and width are larger than a threshold, motion vector data are added in both first/last rows and first/last columns.

* * * * *